(12) United States Patent
Starrs

(10) Patent No.: US 7,389,913 B2
(45) Date of Patent: Jun. 24, 2008

(54) METHOD AND APPARATUS FOR ONLINE CHECK PROCESSING

(76) Inventor: Ed Starrs, 674 Platt Cir., El Dorado Hills, CA (US) 95762

( * ) Notice: Subject to any disclaimer, the term of this patent is extended or adjusted under 35 U.S.C. 154(b) by 0 days.

(21) Appl. No.: 11/413,673

(22) Filed: Apr. 28, 2006

(65) Prior Publication Data
US 2007/0288380 A1 Dec. 13, 2007

(51) Int. Cl.
G06F 19/00 (2006.01)
(52) U.S. Cl. .............. 235/379; 235/375; 705/1; 705/26; 705/45
(58) Field of Classification Search ............. 235/379, 235/375; 705/26, 1, 45
See application file for complete search history.

(56) References Cited

U.S. PATENT DOCUMENTS 5,732,400 A 3/1998 Mandler et al.

| | | | |
|---|---|---|---|
| 2003/0093367 A1 | 5/2003 | Allen-Rouman et al. | |
| 2004/0199462 A1* | 10/2004 | Starrs | 705/39 |
| 2006/0045321 A1 | 3/2006 | Yu | |
| 2006/0161501 A1* | 7/2006 | Waserstein et al. | 705/65 |
| 2007/0156438 A1* | 7/2007 | Popadic et al. | 705/1 |

OTHER PUBLICATIONS

Neuman, B C., and Gennady Medvinsky. "Requirements for Network Payment: the NetCheque Perspective." IEEE (1995).*

* cited by examiner

*Primary Examiner*—Michael G. Lee
*Assistant Examiner*—Allyson N Trail
(74) *Attorney, Agent, or Firm*—Sawyer Law Group LLP

(57) ABSTRACT

Methods and apparatus for processing an online payment for an item. In one implementation, the method includes receiving information from a user corresponding to online payment for an item. The information from the user is received through a graphical user interface, and includes an authorization to pay for the item using an electronic check. The method further includes creating an electronic image of an authorized demand draft based on the authorization received from the user. The electronic image of the authorized demand draft is created directly from the information provided by the user through the graphical user interface.

29 Claims, 29 Drawing Sheets

ACME Anvils

500

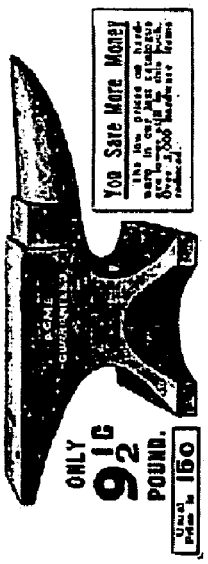

Massive Anvil blowout!
Limited time only!
Was $899.95

Now Only $29.95

You Save 96.666%

*shipping is extra quantity [1]

Note: average anvil weight is 245 lbs.

[Checkout]

Welcome to our state-of the art online store,
where all the latest is available for the discerning consumer.

Here it is, the item that made us a household word....

- Home
- Products
- Showcase
- Store
- Solutions
- Support
- Investor Relations
- News Room
- Community Events
- Jobs
- Contact
- More

*FIG. 5*

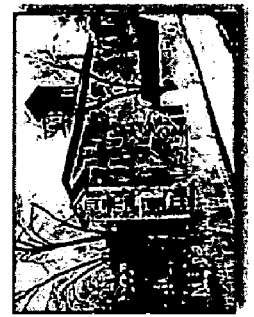
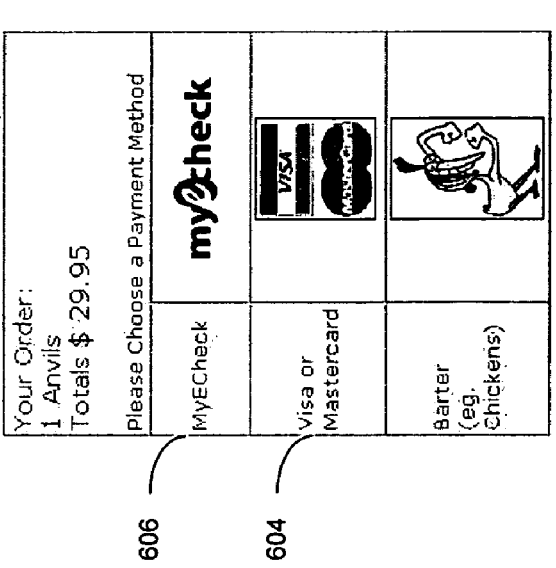
ACME Anvils
Home
Products
Showcase
Store
Solutions
Support
Investor Relations
News Room
Community Events
Jobs
Contact
More
FIG. 6

FIG. 8

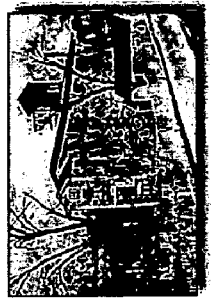

ACME Anvils

MyECheck Registration

In order to protect your checking account from unauthorized use, MyECheck requires that customers strongly identify themselves prior to approving transactions. Your Social Security Number and Date of Birth are necessary to properly identify you as a legitimate checking account owner.

MyECheck employs the industries most stringent encryption, access control and data monitoring techniques and will not share your personal information with any outside third parties. A complete description of our data protection safeguards can be found in the MyECheck Privacy Policy.

Date of Birth: Month [Nov ▼] Day [04 ▼] Year [1960 ▼]

Social Security Number: [485] [96] [0000]

If you have moved within last 12 month, please enter your previous home address.

Address: [        ] Apt/Ste: [   ]

City: [        ] State: [▼] Zip: [   ]

[Continue]

If you wish to cancel this transaction and return to the merchant site, please click here.

Copyright 1975 Acme USA Corp.

- Home
- Products
- Showcase
- Store
- Solutions
- Support
- Investor Relations
- News Room
- Community Events
- Jobs
- Contact
- More

FIG. 12

ACME Anvils

— 1300

MyECheck Registration

In order to simplify future MyECheck transactions, please take a moment to select your personal Username, Password, PIN and Secret Question/Answer.

Username:
Password:
Confirm password:
Account PIN:
Confirm Account PIN:
Secret question:
Answer:

[Continue]

© 2005 MyECheck, Inc., All Rights Reserved

Home
Products
Showcase
Store
Solutions
Support
Investor Relations
News Room
Community Events
Jobs
Contact
More copyright 1975 Acme USA Corp.

FIG. 13

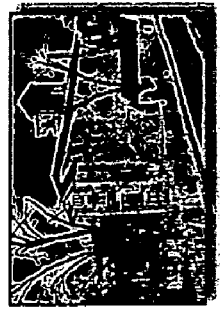

ACME Anvils

— 1400

Registration and payment successfully completed

Congratulations, your payment transaction has been approved and your MyECheck account has been successfully created!

Thank you for registering with MyECheck!

You will be automatically redirected to the merchant site in 10 seconds. If not please use Link © 2005 MyECheck, Inc., All Rights Reserved Home
Products
Showcase
Store
Solutions
Support
Investor Relations
News Room
Community Events
Jobs
Contact
More copyright 1975 Acme USA Corp.

| ? | Description | Value |
|---|---|---|
| 1 | Record Type | "01" |
| 2 | Standard Level | "03" |
| 3 | Test File Indicator | "T" |
| 4 | Immediate Destination Routing Number | "000000123" |
| 5 | Immediate Origin Routing Number | "044000804" |
| 6 | File Creation Date | "20050324" |
| 7 | File Creation Time | "1143" |
| 8 | Resend Indicator | "N" |
| 9 | Immediate Destination Name | " " |
| 10 | Immediate Origin Name | " " |
| 11 | File ID Modifier | " " |
| 12 | Country Code | " " |
| 13 | User Field | " " |
| 14 | Reserved | " " |

- File Header
  - 01
  - Cash Letter 1 -
    - 10
    - Bundle 1 -
      - 20
      - Item 1 - 0063000
        - 25
        - Front
          - 50
          - 52
        - Back
          - 50
          - 52
      - 70
    - 90
  - 99

| Item | Description | Value |
|---|---|---|
| 1 | Record Type | "10" |
| 2 | Collection Type Indicator | "01" |
| 3 | Destination Routing Number | "000000123" |
| 4 | ECE Institution Routing Number | "044000804" |
| 5 | Cash Letter Business Date | "20050324" |
| 6 | Cash Letter Creation Date | "20050324" |
| 7 | Cash Letter Creation Time | "1143" |
| 8 | Cash Letter Record Type Indicator | "I" |
| 9 | Cash Letter Documentation Type Indicator | "G" |
| 10 | Cash Letter ID | " " |
| 11 | Originator Contact Name | " " |
| 12 | Originator Contact Phone Number | " " |
| 13 | Fed Work Type | " " |
| 14 | User Field | " " |
| 15 | Reserved | " " |

- File Header
  - 01
  - Cash Letter 1 -
    - 10
    - Bundle 1 -
      - 20
      - Item 1 - 000000
        - 25
        - Front
          - 50
          - 52
        - Back
          - 50
          - 52
      - 70
    - 90
  - 99

| E... | Description | Value |
|---|---|---|
| 1 | Record Type | "20" |
| 2 | Collection Type Indicator | "01" |
| 3 | Destination Routing Number | "000000123" |
| 4 | ECE Institution Routing Number | "044000304" |
| 5 | Bundle Business Date | "20050324" |
| 6 | Bundle Creation Date | "20050324" |
| 7 | Bundle ID | • |
| 8 | Bundle Sequence Number | • |
| 9 | Cycle Number | • |
| 10 | Return Location Routing Number | • |
| 11 | User Field | • |
| 12 | Reserved | • |

⊟ File Header
  .01
  ⊟ Cash Letter 1 -
  ---- 10
  ---- ⊟ Bundle 1 -
  ------- [20]
  ------- ⊟ Item 1 - 0300000
  ----------- 25
  ----------- ⊟ Front
  --------------- 50
  --------------- 52
  ----------- ⊟ Back
  --------------- 50
  --------------- 52
  ----------- 70
  ------- 90
  ---- 99

| F... | Description | Value |
|---|---|---|
| 1 | Record Type | "25" |
| 2 | Auxiliary OnUs | " " |
| 3 | External Processing Code | "0139132601" |
| 4 | Payor Bank Routing Number | "00000012" |
| 5 | Payor Bank Routing Number Check Digit | "5" |
| 6 | OnUs | " 0434338834" |
| 7 | Item Amount | "0000104699" |
| 8 | ECE Institution Item Sequence Number | "000000000123456" |
| 9 | Documentation Type Indicator | "G" |
| 10 | Return Acceptance Indicator | "9" |
| 11 | MICR Valid Indicator | "D" |
| 12 | BOFD Indicator | "00" |
| 13 | Check Detail Record Addendum Count | "9" |
| 14 | Correction Indicator | "1" |
| 15 | Archive Type Indicator | |

File Header
- 01
- Cash Letter 1
  - 10
  - Bundle 1
    - 20
    - Item 1 - 000000000123456
      - 25
      - From
        - 50
        - 52
      - Back
        - 50
        - 52
    - 70
  - 90

| #  | Description | Value |
|----|-------------|-------|
| 1  | Record Type | "50" |
| 2  | Image Indicator | "1" |
| 3  | Image Creator Routing Number | "044000804" |
| 4  | Image Creator Date | "20050324" |
| 5  | Image View Format Indicator | "00" |
| 6  | Image View Compression Algorithm Ident... | " " |
| 7  | Image View Data Size | "004354" |
| 8  | View Side Indicator | "0" |
| 9  | View Descriptor | " " |
| 10 | Digital Signature Indicator | " " |
| 11 | Digital Signature Method | " " |
| 12 | Security Key Size | " " |
| 13 | Start Of Protected Data | " " |
| 14 | Length Of Protected Data | " " |
| 15 | Image Recreate Indicator | "1" |
| 16 | User Field | " " |
| 17 | Reserved | " " |

File Header
- 01
- Cash Letter 1
  - 10
  - Bundle 1
    - 20
    - Item 1 - 000000000123456
      - 25
      - Front 50
        - 52
      - Back 53
        - 52
    - 70
  - 90
- 99

| # | Description | Value |
|---|---|---|
| 1 | Record Type | "52" |
| 2 | ECE Institution Routing Number | "044000804" |
| 3 | Bundle Business Date | "20050324" |
| 4 | Cycle Number | "" |
| 5 | ECE Institution Item Sequence Number | "000000000123456" |
| 6 | Security Originator Name | "" |
| 7 | Security Authenticator Name | "" |
| 8 | Security Key Name | "" |
| 9 | Clipping Origin | "0" |
| 10 | Clipping Coordinate H1 | "" |
| 11 | Clipping Coordinate H2 | "" |
| 12 | Clipping Coordinate V1 | "" |
| 13 | Clipping Coordinate V2 | "" |
| 14 | Image Reference Key Length | "0" |
| 15 | Image Reference Key | "" |
| 16 | Digital Signature Length | "0" |
| 17 | Digital Signature | "" |
| 18 | Image Data Length | "0004354" |
| 19 | Image Data | "C:\Documents and Settings\aseva.CORP.000...." |

FIG. 25

| F... | Description | Value |
|---|---|---|
| 1 | Record Type | "50" |
| 2 | Image Indicator | "1" |
| 3 | Image Creator Routing Number | "044009804" |
| 4 | Image Creator Date | "20050324" |
| 5 | Image View Format Indicator | "00" |
| 6 | Image View Compression Algorithm Ident... | "00" |
| 7 | Image View Data Size | "0003452" |
| 8 | View Side Indicator | "1" |
| 9 | View Descriptor | "00" |
| 10 | Digital Signature Indicator | "0" |
| 11 | Digital Signature Method |  |
| 12 | Security Key Size |  |
| 13 | Start Of Protected Data |  |
| 14 | Length Of Protected Data |  |
| 15 | Image Recreate Indicator | "1" |
| 16 | User Field |  |
| 17 | Reserved |  |

File Header
 01
  Cash Letter 1 -
   10
    Bundle 1 -
     20
      Item 1 - 000000000123456
       25
        Front
         50
         52
        Back
         50
         52
        70
       90
      99

FIG. 26

| F... | Description | Value |
|---|---|---|
| 1 | Record Type | "52" |
| 2 | ECE Institution Routing Number | "044000804" |
| 3 | Bundle Business Date | "20050324" |
| 4 | Cycle Number | "" |
| 5 | ECE Institution Item Sequence Number | "000000000123456" |
| 6 | Security Originator Name | "" |
| 7 | Security Authenticator Name | "" |
| 8 | Security Key Name | "" |
| 9 | Clipping Origin | "0" |
| 10 | Clipping Coordinate H1 | "" |
| 11 | Clipping Coordinate H2 | "" |
| 12 | Clipping Coordinate V1 | "" |
| 13 | Clipping Coordinate V2 | "" |
| 14 | Image Reference Key Length | "0" |
| 15 | Image Reference Key | "" |
| 16 | Digital Signature Length | "0" |
| 17 | Digital Signature | "" |
| 18 | Image Data Length | "0308453" |
| 19 | Image Data | "C:\Documents and Settings\steve.CORP.000..." |

- File Header
  - 01
  - Cash Letter 1
    - 10
    - Bundle 1
      - 20
      - Item 1 - 000000000123456
        - 25
        - Front
          - 50
          - 52
        - Back
          - 50
          - 52
      - 70
    - 90
  - 99

FIG. 27

| I... | Description | Value |
|---|---|---|
| 1 | Record Type | "70" |
| 2 | Items Within Bundle Count | "0001" |
| 3 | Bundle Total Amount | "00000104499" |
| 4 | MICR Valid Total Amount | "00000104499" |
| 5 | Images Within Bundle Count | "0002" |
| 6 | User Field | " " |
| 7 | Reserved | |

File Header
- 01
- Cash Letter 1 -
  - 10
  - Bundle 1 -
    - 20
    - Item 1 - 000000000123456
      - 25
      - Front
        - 50
        - 52
      - Back
        - 50
        - 52
    - 70
  - 90
- 99

*FIG. 28*

| F... | Description | Value |
|---|---|---|
| 1 | Record Type | "90" |
| 2 | Bundle Count | "000001" |
| 3 | Items Within Cash Letter Count | "00000001" |
| 4 | Cash Letter Total Amount | "000000000104499" |
| 5 | Images Within Cash Letter Count | "000000002" |
| 6 | ECE Institution Name | |
| 7 | Settlement Date | |
| 8 | Reserved | |

File Header
— 01
⊕ Cash Letter 1 -
— 10
⊕ Bundle 1 -
— 20
⊕ Item 1 - 00000000000123456
— 25
⊕ Front
— 50
— 52
⊕ Back
— 50
— 52
— 70
90
— 99

*FIG. 29*

| I... | Description | Value |
|---|---|---|
| 1 | Record Type | "99" |
| 2 | Cash Letter Count | "000001" |
| 3 | Total Record Count | "00000012" |
| 4 | Total Item Count | "00000001" |
| 5 | File Total Amount | "00000000000104499" |
| 6 | Immediate Origin Contact Name | " " |
| 7 | Immediate Origin Contact Phone Number | " " |
| 8 | Reserved | " " |

- File Header — 01
  - Cash Letter 1 — 10
    - Bundle 1 — 20
      - Item 1 — 00000000123456 — 25
        - Front — 50, 52
        - Back — 50, 52
      — 70
    — 90
  — 99

*FIG. 30*

METHOD AND APPARATUS FOR ONLINE CHECK PROCESSING

FIELD OF THE INVENTION

The present invention relates generally to data processing, and more particularly to methods and apparatus for processing a bank instrument.

BACKGROUND OF THE INVENTION

The development of the Internet has created new online markets and marketplaces. For example, a user (e.g., a consumer) with an Internet connection can search for a variety of items (including, for example, physical products, services, digital media or content, and the like) provided by online merchants. Users can typically pay for items using a number of different online payment processing options. One common online payment processing option includes payment through credit cards. In a typical credit card payment purchasing scheme, a user accesses a website (e.g., of a merchant or other provider of items) and provides required personal information and a credit card number. The merchant submits a charge to a corresponding credit card company, and completes the online payment purchase with the user once the credit card company authorizes the charge. Online merchants, however, are exposed to high costs associated with fraud and charge back fees, and bear liability because typically no credit card signature is required when a user pays online using a credit card.

Another online payment processing option includes payment using electronic checks (referred to herein also as e-checks) through a funds transfer system associated with the Automated Clearing House (ACH) network. The ACH network is an electronic funds transfer system governed by NACHA (National Automated Clearing House Association) which sets operating rules that provide for inter-bank clearing of electronic payments for participating depository financial institutions. However, as with the credit card payment purchasing scheme, payments made using e-checks through a funds transfer system associated with the ACH network can be charged back or reversed long after a transaction date. In addition, not all financial institutions (including banks) participate in the ACH network. Other conventional e-check payment systems typically require merchants (or other check processors) to buy special check printing equipment and proprietary checks, so that the merchants can print out and then deposit physical paper copies of the consumer check. Merchants, however, must typically wait a long period of time (e.g., 5-7 days) for a printed check to clear.

Accordingly, what is needed is an improved online consumer payment solution. The present invention addresses such a need.

SUMMARY OF THE INVENTION

In general, in one aspect, this specification describes a computer-implemented method for processing an online payment for an item. The method includes receiving information from a user corresponding to the online payment for the item. The information from the user is received through a graphical user interface, and includes an authorization to pay for the item using an electronic check. The method further includes creating an electronic image of an authorized demand draft based on the authorization received from the user. The electronic image of the authorized demand draft is created directly from the information provided by the user through the graphical user interface.

Particular implementations can include one or more of the following features. Creating an electronic image of an authorized demand draft can include creating an electronic image of an authorized demand draft that is compliant with the Check Clearing for the 21st Century Act (Check 21). The electronic image of the authorized demand draft can be unsigned by the user. The method can further include transmitting the electronic image of the authorized demand draft to a financial institution, and receiving funds from the financial institution based on the electronic image of the authorized demand draft to provide payment for the item. Creating an electronic image of an authorized demand draft, transmitting the electronic image of the authorized demand draft to a financial institution, and receiving funds from the financial institution based on the electronic image of the authorized demand draft can be performed substantially in real-time. The method can further include performing one or more real-time verifications on the user prior to creating the electronic image of the authorized demand draft. Performing one or more real-time verifications on the user can include generating a blended risk score on the user. The blended risk score can correspond to a degree of risk associated with successfully performing an online payment transaction with the user. The blended risk score can be a composite of a plurality of individual risk scores. The information from the user can be received through a graphical user interface associated with a website of a merchant through which the item is purchasable.

In general, in another aspect, this specification describes a check processing system for processing an online payment from a user, in which the online payment is for an item that is purchasable through a website of a merchant. The check processing system includes a first engine to receive information from the user corresponding to the online payment for the item. The information from the user is received through a graphical user interface associated with the website of the merchant. The information from the user includes a name of the user, bank data associated with the user, and an authorization to pay for the item using an electronic check. The check processing system further includes a second engine to create an electronic image of an authorized demand draft based on the authorization received from the user. The electronic image of the authorized demand draft is created directly from the information provided by the user through the graphical user interface associated with the website of the merchant. The electronic image of the authorized demand draft includes the name of the user, the bank data associated with the user. The check processing system further includes a third engine to transmit the electronic image of the authorized demand draft to a financial institution corresponding to the bank data associated with the user, and a fourth engine to receive funds from the financial institution based on the electronic image of the authorized demand draft to provide payment for the item.

Implementations can include one or more of the following features. The fourth engine can be operable to receive the funds from the financial institution substantially in real-time relative to when the electronic image of the authorized demand draft is created and transmitted to the financial institution. The first engine, the second engine, the third engine, and the fourth engine can be components of the same engine. The check processing system can further include a fifth engine operable to perform one or more real-time verifications on the user prior to the second engine creating the electronic image of the authorized demand draft. The fifth engine can be operable to perform one or more real-time verifications including generating a blended risk score on the user.

In general, in another aspect, this specification describes a computer-implemented method for processing an online payment from a user, in which the online payment is for an item that is purchasable through a website of a merchant. The method includes receiving information from the user corresponding to the online payment for the item. The information from the user is received through a graphical user interface associated with the website of the merchant, and includes a name of the user, bank data associated with the user, and an authorization to pay for the item using an electronic check. The method further includes creating an electronic image of an authorized demand draft based on the authorization received from the user. The electronic image of the authorized demand draft is created directly from the information provided by the user through the graphical user interface associated with the website of the merchant, and includes the name of the user, the bank data associated with the user. The method further includes transmitting the electronic image of the authorized demand draft to a financial institution corresponding to the bank data associated with the user, and receiving funds from the financial institution based on the electronic image of the authorized demand draft to provide payment for the item.

Particular implementations can include one or more of the following features. The item can comprise one of a physical product, a service, digital media, or digital content. The financial institution can be one of a bank, savings and loan (S&L), credit union, or Federal Reserve.

Implementations may provide one or more of the following advantages. In one implementation, a fully integrated online check processing system is provided that functions much like credit card authorization and settlement, but is much more universally available to consumers or other users. Unlike transactions involving credit cards or a funds transfer system associated with the ACH network, the electronic images of authorized demand drafts created by the check payment/processing system cannot be easily or readily reversed, and are acceptable at every U.S. bank. Moreover, the check processing system is not subject to NACHA rules and/or other regulatory oversight.

The details of one or more implementations are set forth in the accompanying drawings and the description below. Other features and advantages will be apparent from the description and drawings, and from the claims.

BRIEF DESCRIPTION OF THE DRAWINGS

FIGS. 5-14 are screen shots of exemplary graphical user interfaces that can be implemented on, for example, a merchant website.

FIGS. 15-30 illustrate an example electronic image of an authorized demand draft in accordance with one implementation.

Like reference symbols in the various drawings indicate like elements.

DETAILED DESCRIPTION OF THE INVENTION

Implementations of the present invention relates generally to data processing, and more particularly to methods and apparatus for processing a bank instrument. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
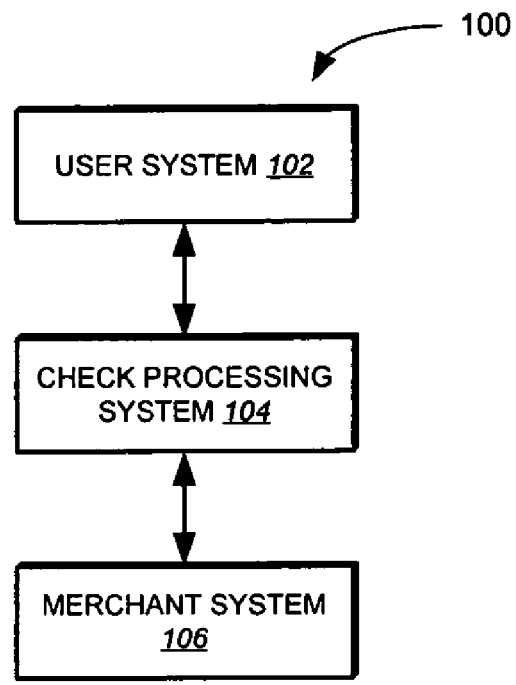
FIG. 1 is a block diagram of an online payment system including a check processing system in accordance with one implementation.

FIG. 1 illustrates an online payment system 100 in accordance with one implementation. In one implementation, the online payment system 100 includes a user system 102, a check processing system 104 and a merchant system 106. In one implementation, the user system 102, the check processing system 104 and the merchant system 106 are interconnected through a network (e.g., the Internet or other wide area network). Other types of networks through which the online payment system 100 can be interconnected include, for example, telephone networks, wireless digital networks, serial cable networks, ATM or credit card networks, or other private networks and collections of networks including intranets, and/or local area networks. In one implementation, the check processing system 104 permits a user (using the user system 102) to pay for items (including, e.g., physical products, services, digital media or content, and the like) that are displayed on (or available/purchasable through) a website, e.g., a merchant website provided by the merchant system 106. In one implementation, the check processing system 104 generates an electronic image of an (unsigned) authorized demand draft, or other bank instrument, (based on user information) that is compliant with the Check Clearing for the 21st Century Act (Check 21), which electronic image is then processed at a financial institution to provide payment for an item. Such financial institutions include, for example, banks, savings and loans (S&Ls), credit unions, the Federal Reserve, and other check processing centers. In general, the electronic image of the authorized demand draft is a bank instrument corresponding to, for example, a personal check, business check, certified check, bank check, sight draft, demand draft, money order, and the like. Unlike transactions involving credit cards or a funds transfer system associated with the ACH network, the electronic images of authorized demand drafts created by the check processing system 104 cannot be easily or readily reversed and are acceptable at all U.S. banks and other financial institutions.

Check 21 is a new federal law that was signed on Oct. 28, 2003, and became effective on Oct. 28, 2004. Check 21 is designed to foster innovation in the payments system and to enhance efficiency by reducing some of the legal impediments to check truncation. The law facilitates check truncation by creating a new negotiable instrument called a substitute check, which permits banks to truncate original checks, to process check information electronically, and to deliver substitute checks to banks that want to continue receiving paper checks. A substitute check is the legal equivalent of the original check and includes all the information contained on the original check. Accordingly, Check 21 permits banks to process paper checks electronically for faster, more efficient check clearing. Instead of physically moving paper checks between banks, Check 21 permits banks to capture a picture of the front and back of a check and transmit the picture electronically.

Referring to FIG. 1, in one implementation, the electronic image of the authorized demand draft generated by the check processing system 104 is made payable to an entity (e.g., a person or business) associated with the check processing system 104. In this implementation, the check processing system 104 can provide funds received from a financial institution (responsive to a corresponding electronic image of an authorized demand draft) to an entity (e.g. a person or business) associated with the merchant system 106. The check processing system 104 can provide the funds to the merchant system 106 through (e.g.) wire, ACH, or a paper check. In one implementation, the electronic image of the authorized demand draft generated by the check processing system 104 is made payable to an entity associated with the merchant system 106. In this implementation, the funds are provided from the financial institution (or drawee bank) directly to the merchant system 106. In this implementation, the electronic image can be sent directly from the check processing system 104 to the financial institution (or indirectly through a $3^{rd}$ party or the merchant system 106). For example, the electronic image can first be sent to a bank associated with the merchant system 106, which will then forward the electronic image to the drawee bank. The financial system can provide the funds to the merchant system 106 through (e.g.) wire, ACH, or a paper check. Alternatively, the electronic image of the authorized demand draft generated by the check processing system 104 can be made payable to an entity associated with a $3^{rd}$ party not associated with the check processing system 104 or the merchant system 106. In this implementation, the settlement of funds for payment of an item is provided by the $3^{rd}$ party.

In addition to making payments for items that are available through a website, the check processing system 104 can be used to make payments for items generally. For example, the check processing system 104 can be used to provide payment for car payments, insurance payments, mortgage payments, payroll checks, and so on. In one implementation, the check processing system 104 is operable to automatically make recurring payment by generating electronic images of the authorized demand drafts on a pre-determined reoccurring basis. The recurring payments can involve creation of an electronic image of an authorized demand draft based on a previous authorization made for other electronic images.

Figure 2:
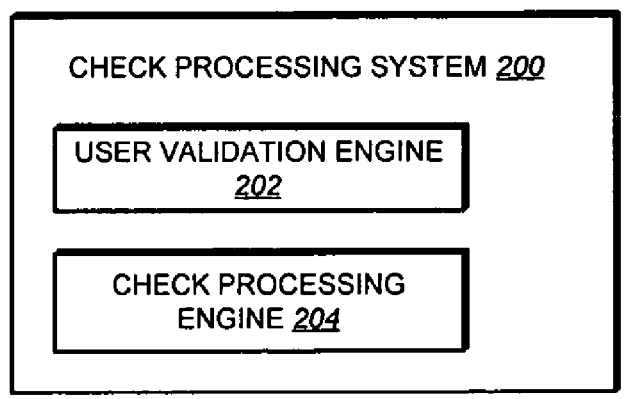
FIG. 2 illustrates a block diagram of the check processing system of FIG. 1 in accordance with one implementation.

FIG. 2 illustrates a block diagram of a check processing system 200 in accordance with one implementation. In one implementation, the check processing system 200 includes a user validation engine 202 and a check processing engine 204. Although the check processing system 200 is shown as including two separate engines—e.g., the user validation engine 202 and the check processing engine 204—the check processing system can include other engines (not shown) operable to perform the functions described below. In addition, the two separate engines can be combined into a single engine.

In one implementation, the user validation engine 202 performs a series of real-time verifications to ensure that every electronic check (or demand draft) is authorized by a user (or account owner), and that the check will clear the user's bank (or other financial institution associated with the user). More generally, the user validation engine 202 provides bank data, age and identity verification for users of the check processing system 200. In one implementation, the user validation engine 202 generates a blended risk score for each user that registers with the check processing system 200 as described in pending U.S. patent application Ser. No. 10/405,410—entitled "Fraud Control Method and System For Network Transactions", which is incorporated by reference herein. In one implementation, the blended risk score corresponds to a degree of risk associated with successfully performing an online payment transaction with a given user. For example, a good blended risk score for a user can indicate a greater likelihood of a successful online payment transaction.

Figure 3:
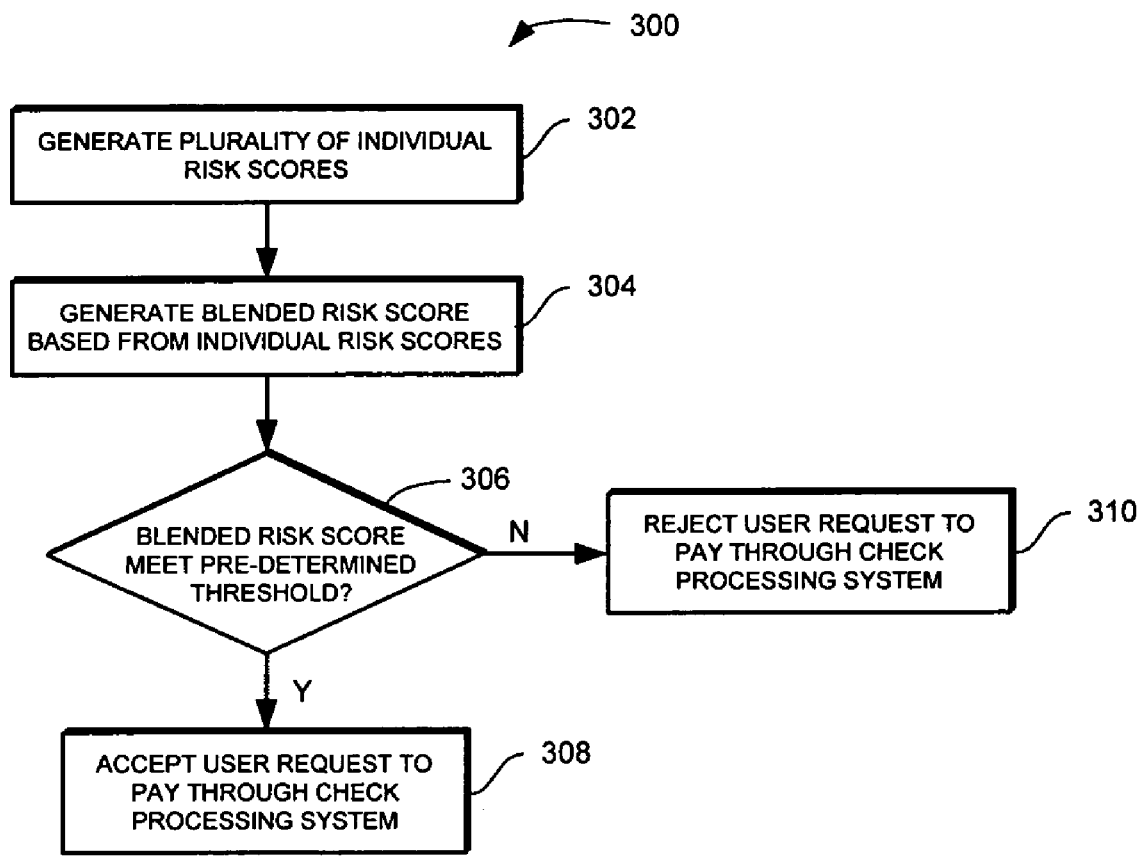
FIG. 3 illustrates a method for authorizing a user in accordance with one implementation.

For example, referring to FIG. 3, a method 300 for validating a user is shown according to one implementation. A plurality of individual risk scores are generated (e.g., by the user validation engine 202) (step 302). The plurality of individual risk scores can be generated based at least in part on information provided by a user that desires to pay for an item using the check processing system 200. In one implementation, a first individual risk score is generated from a credit history of a user. In this case, the first individual risk score can correspond to a credit score of a given user. In one implementation, a second individual risk score is generated using Network Geolocation Technology (NGT)) to determine a user's physical location, which is compared to a reported location and IP address of the user's (hardware) system. In this implementation, the second individual risk score corresponds to the certainty that a user is physically located near a user system through which the user's information was received. Other individual risk scores can be generated to verify user information and/or bank data using any type of suitable information including for example, publicly maintained databases (e.g., Department of Motor Vehicles (DMV) records, education records, and the like) or privately maintained databases (e.g., Lexis-Nexis, Martindale-Hubbell, and the like).

A blended (or composite) risk score is generated (e.g., by the user validation engine 202) (step 304). In one implementation, the blended risk score is generated by assigning weights to each of the plurality of individual risk scores, substantially according to equation 1 below:

$$(X)(1\text{st risk score}) + (Y)(2\text{nd risk score}) + \ldots + (Z)(n\text{th risk score}) = \text{blended risk score} \qquad (\text{eq. 1})$$

where X, Y, and Z represent a weight assigned to a given risk score. The weights can be assigned to give more (or less) influence to each of the individual risks scores on the (overall) blended risk score. A determination is made (e.g., by the user validation engine 202) whether the blended risk score meets a pre-determined threshold (step 306). The pre-determined threshold can correspond to a level of acceptable risk. If the blended risk score meets the predetermined threshold then a user request to pay using the check processing system is accepted (e.g., by the user validation engine 202) (step 308). If the blended risk score does not meet the pre-determined threshold then the user request to pay using the check processing system is rejected (e.g., by the user validation engine 202) (step 310).

Figure 4:
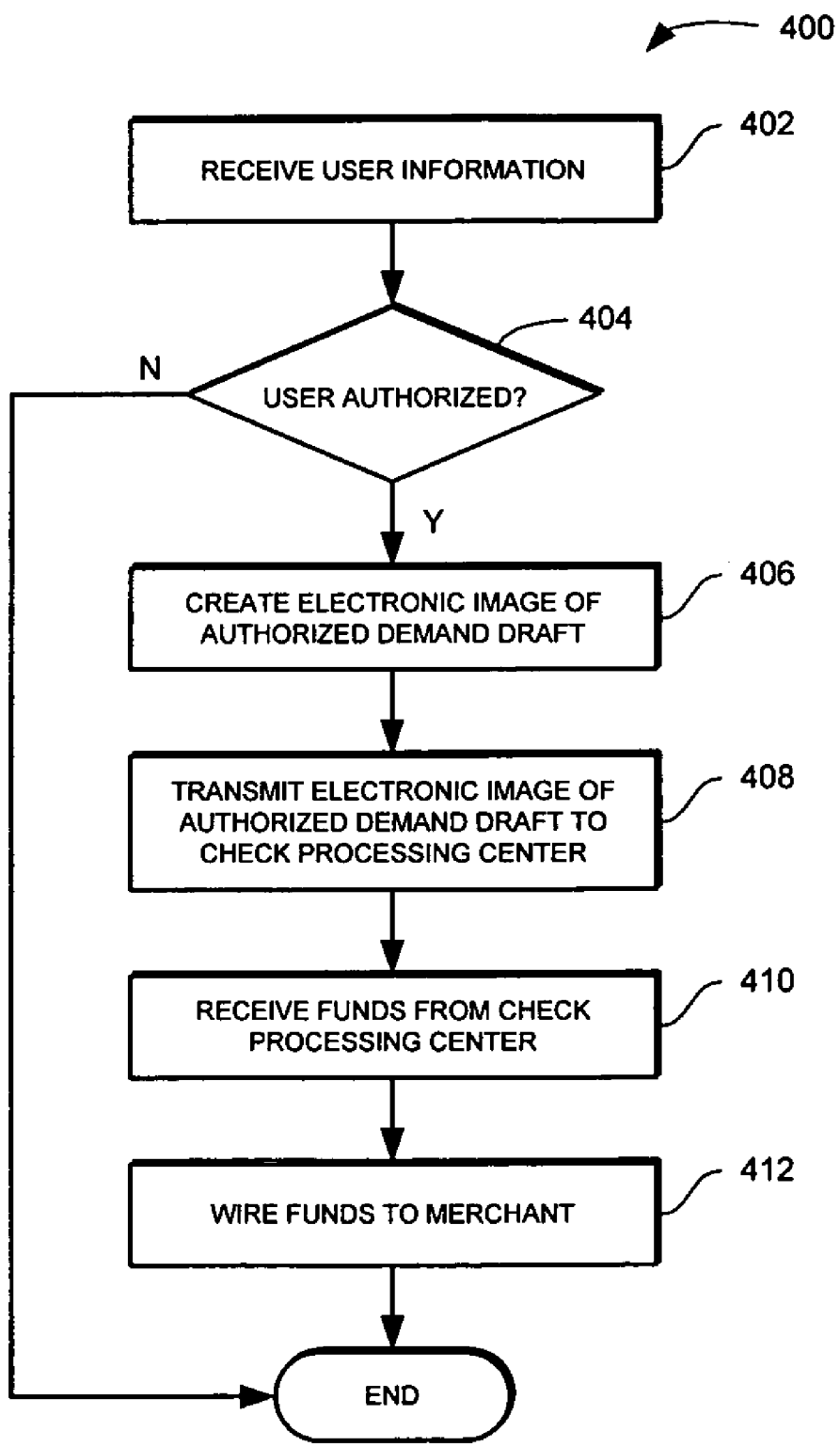
FIG. 4 illustrates a method for processing an electronic check online in accordance with one implementation.

Referring again to FIG. 2, (in one implementation) the check processing engine 204 is operable to create an electronic image of an authorized demand draft (or an electronic check) that can be processed to provide online payment for an item. For example, referring to FIG. 5, a screenshot 500 is shown of a user selecting (1) anvil for purchase through a merchant website. As shown in FIG. 6, a screenshot 600 is shown including a window 602 that provides a number of payment options for selection by the user. The window 602 includes a conventional credit card payment option 604 and an electronic check payment option 606 ("MyECheck") through which an electronic image of an authorized demand draft can be generated to pay for the anvil. FIG. 4 illustrates one implementation of a method for processing an electronic image of an authorized demand draft.

Figure 7:
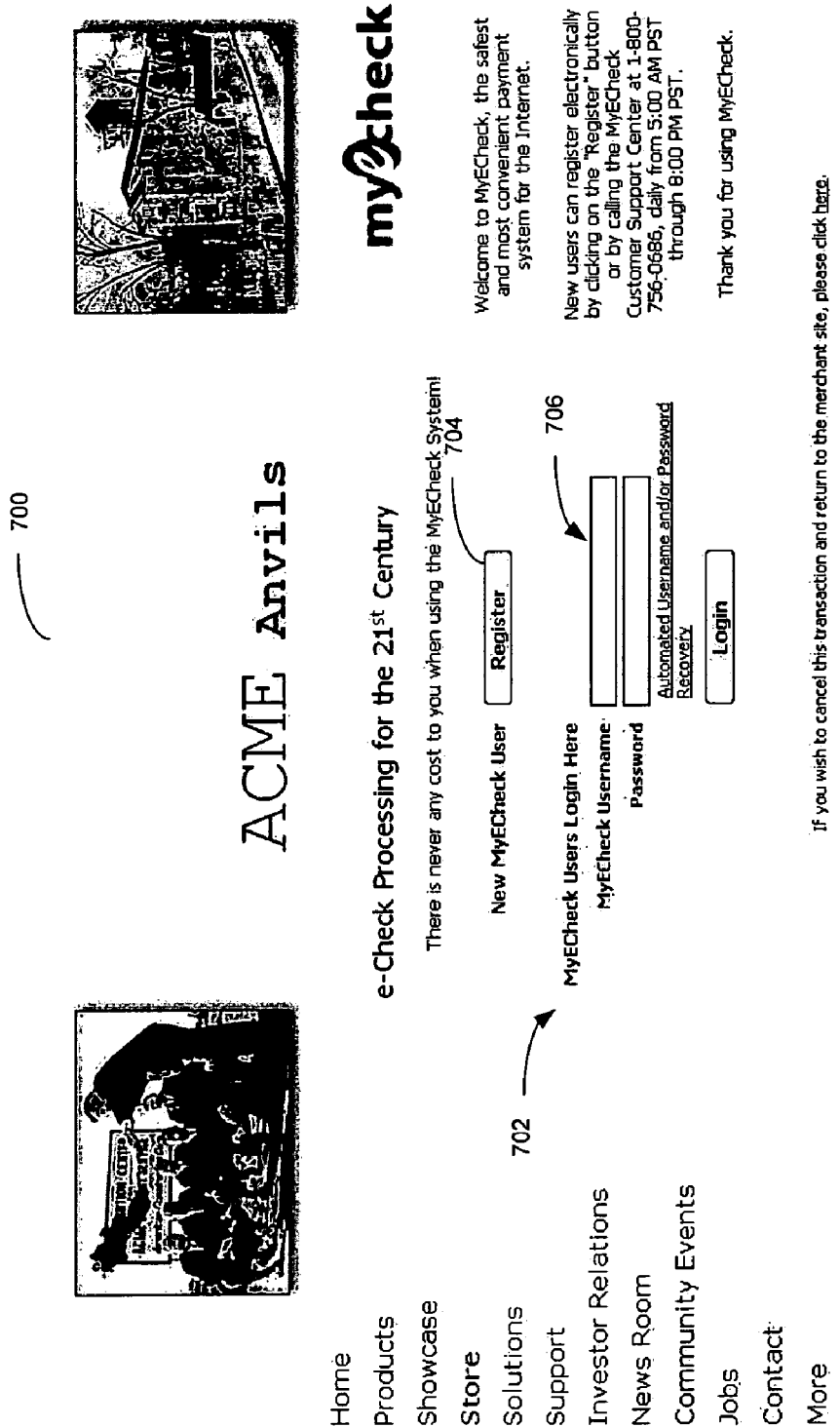
Figure 9:
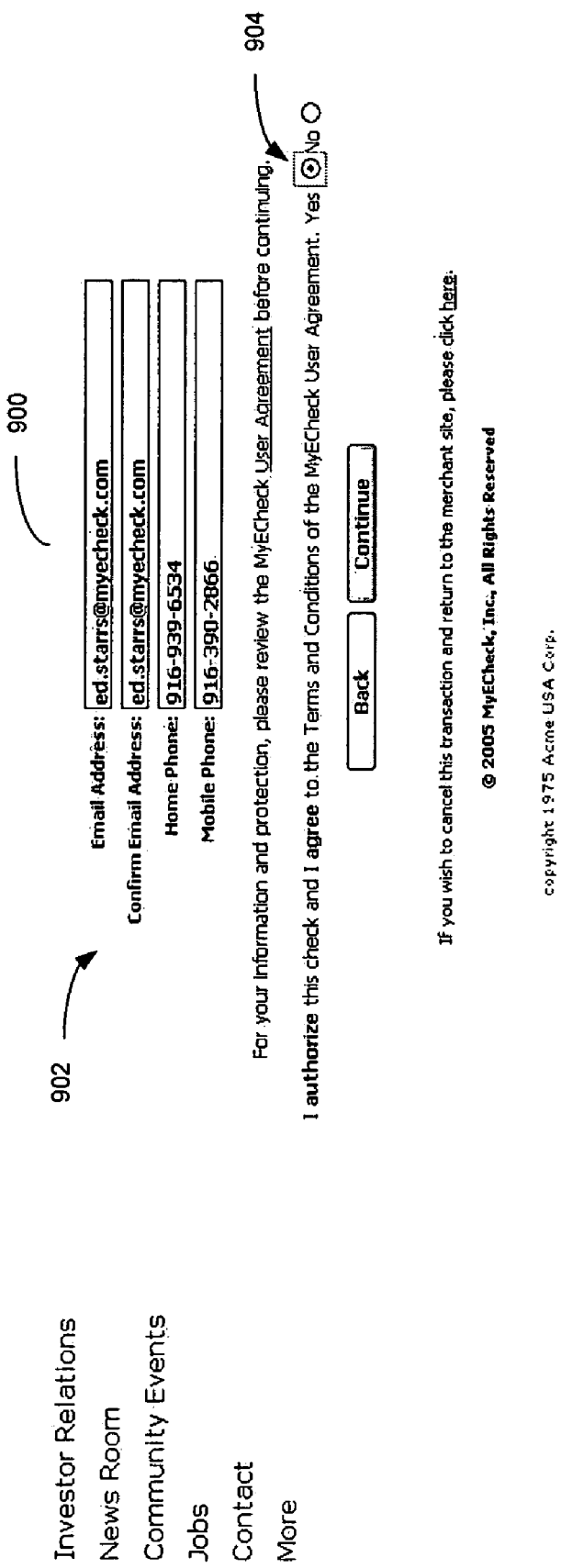

As shown in FIG. 4, user information is received (step 402). In one implementation, the user information is received though a user registration process. For example, FIG. 7 shows a screenshot 700 of a login screen 702 that is displayable to a user once the user selects the electronic check payment option 606 (FIG. 6). In one implementation, the login screen 702 includes a registration section 704 for new users and a login section 706 for returning users. If a given user is a returning user, then the user's information can be retrieved from a database or other storage. FIG. 8 shows a screenshot 800 of a registration screen 802 that is displayable to new users of the electronic check payment option. In one implementation, the user information that is received includes date, name, address, driver's license identification number, bank data (e.g., including a bank routing number and a bank account number), payee information, and the amount to be paid. In one implementation, the information is entered directly into an electronic template 804 in the form of a conventional paper check as shown in FIG. 8. As discussed above, the payee can be an entity associated with the check processing system, the merchant system, or a $3^{rd}$ party. FIG. 9 shows a screenshot 900 of an authorization page 902. In one implementation, the authorization page 902 includes email and telephone contact numbers and includes an authorization selection button 904 indicating a user's authorization of an electronic check.

Figure 11:

In one implementation, prior to completing registration, a user enters additional personal information including, for example, date of birth, social security number, previous home addresses, and so on, as shown in the screenshot 1000 of FIG. 10. FIG. 11 illustrates a screenshot 1100 of a confirmation page 1102 containing all of the information previously entered by a user. In one implementation, a quiz is presented to a user (e.g., by the user validation engine 202 (FIG. 2)) to further confirm identity of the user as shown in the screenshot 1200 of FIG. 12. The questions can be generated from public and/or private databases, or other information databases. FIG. 13 illustrates a screenshot 1300 of additional information that can be entered by a user to simplify future electronic check payment transactions. The additional information includes a username, password, account PIN (personal identification number), secret question and answer. The secret question and answer can be used to verify identity of a user should the user later forget a username, password, and/or account PIN.

Referring again to FIG. 4, a determination is made (e.g., by the user validation engine 202 of FIG. 2) whether the user is authorized to complete online payment using the electronic check payment option. In one implementation, a user is authorized to complete an online payment using the electronic check payment option if a blended risk score associated with the user meets a pre-determined threshold as discussed above. If the user is not authorized to complete the online payment, then the process ends. If the user is authorized to complete the online payment using the electronic check payment option, then an electronic image of an authorized demand draft is created (e.g., by the check processing engine 202 of FIG. 2) (step 406). In one implementation, the electronic image of the authorized demand draft is created directly from information provided by a user through a graphical user interface, e.g., running on (or associated with) a website of a merchant. For example, referring to FIG. 8, an electronic image of an authorized demand draft can be created based on the information provided on the electronic template of a conventional check. More generally, the information for generating an electronic image of an authorized demand draft can be received through data collection means or transmittal methods. For example, the information for generating an electronic image of an authorized demand draft can be received from a merchant (or payment gateway). In one implementation, the check processing engine generates electronic images of authorized demand draft in response to transactions that are sent to the check processing engine in batches. For example, a merchant may delay release of payment processing of a previously authorized transaction to the check processing system (e.g., the purchase of a charter flight plane ticket may require the merchant to defer issuance (by hours or days) pending confirmation of seat availability of a carrier).

In one implementation, the electronic image of the authorized demand draft is compliant with Check 21 to guarantee that the electronic image of the authorized demand draft will be acceptable at all U.S. banks or other financial institutions. In one implementation, the electronic image of the authorized demand draft is unsigned by the user. Alternatively, an electronic signature can be placed on the electronic image of the authorized demand draft. The electronic image of the authorized demand draft is transmitted (e.g., by the check processing system 200 (FIG. 2)) to a check processing center (e.g., the user's bank or other financial institution) (step 408). In one implementation, the electronic image of the authorized demand draft is transmitted substantially in real-time to the check processing center. Once the electronic image of the authorized demand draft is processed, funds are received (e.g., by the check processing system 200) (step 410). In one implementation, the funds are received by the check processing system substantially in real-time. The funds are then wired to the merchant (step 412). FIG. 14 shows a screenshot 1400 indicating successful online registration and payment through the electronic check payment option. Alternatively, as discussed above, the electronic image of the authorized demand draft can be made payable to the merchant (or a $3^{rd}$ party), in which case the check processing center (or financial institution) directly sends the funds to the merchant (or the $3^{rd}$ party).

FIGS. 15-30 illustrate one implementation of an electronic image of an authorized demand draft, and components (or data sources) thereof. The electronic images shown in FIGS. 15-30 are electronic X9.37 image files. In general, various financial institutions have different requirements regarding acceptance of an electronic image of an authorized demand draft and, therefore, the electronic image (and components thereof) shown in FIGS. 15-30 are exemplary.

Figure 15:
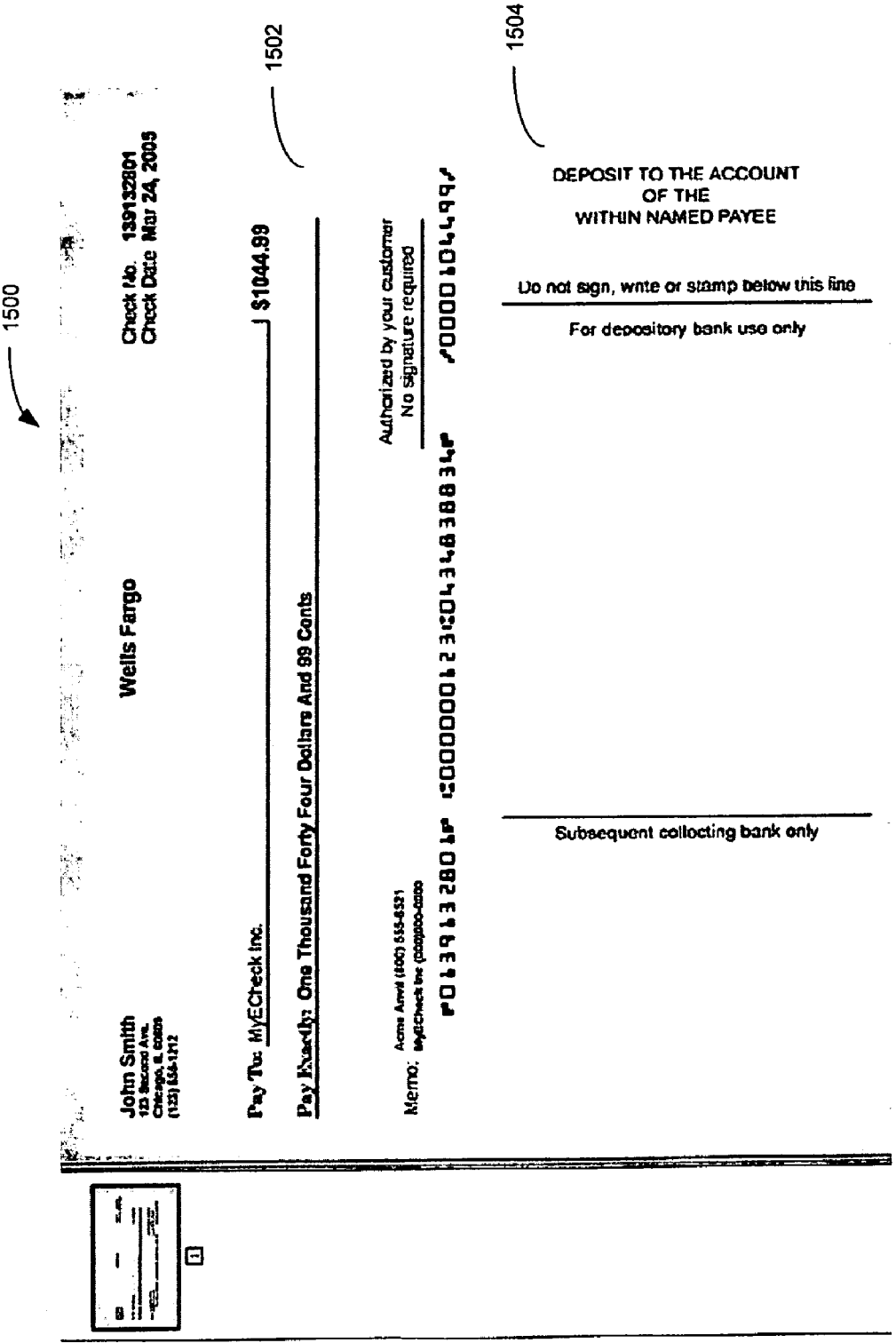

Referring first to FIG. 15, one implementation of an electronic image of an authorized demand draft 1500 is shown. The electronic image of an authorized demand draft 1500 includes a front side 1502 and a back side 1504. As shown on the front side 1502, the electronic image of an authorized demand draft 1500 is unsigned. FIG. 16 shows file header that is associated with the electronic image of an authorized demand draft 1500. In one implementation, the file header includes origin and destination routing number information as shown, in addition to the total amount ($1044.99) to be transferred between the two accounts associated with the routing numbers. FIGS. 17-30 respectively illustrates other components (or data sources) that can be associated with the electronic image of an authorized demand draft 1500 including, for example, a record type 01, a cash letter, a record type 10, a bundle, a record type 20, an item identifier (item 1), a record type 25, a record type 50 (associated with the front side 1502), a record type 52 (associated with the front side 1502), a record type 50 (associated with the back side 1504), a record type 52 (associated with the back side 1504), a record type 70, a record type 90, and a record type 99.

Below is provided an exemplary process steps that can occur through a merchant website and a check processing system that is in accordance with the method steps discussed above.

1) Merchant Web Site
    Merchant collects amount of item
    Customer selects Check Processing System to pay for item
2) Check Processing System creates secure session with Customer inside frames on Merchant Web Site
    Amount of item is electronically sent to Check Processing System
    Check Processing System creates a unique session ID and transaction ID
    Check Processing System serves a log-in page Pre-registered users log-in user username and password, and new users click through to register 3) (a) New User Registration Check Processing System serves customer registration pages Customer enters name, address, phone number, driver license number, bank name, bank routing number, bank account number into fields on blank check image Customer enters phone numbers, date of birth, other addresses, social security number into additional fields Customer agrees to terms of use and authorizes transaction Customer's identity attributes are verified by Check Processing System matching customer provided data with data in external private and public records databases Check Processing System serves interactive quiz to customer to validate identity Check Processing System verifies customer bank account funds availability through interfaces with external data providers Check Processing System queries external negative check writer databases Check Processing System uses risk assessment and decision tools to approve or decline transaction Check Processing System serves Approved or Declined page to Customer, declined customers are redirected to the merchant web site Check Processing System serves page for approved customer to enter a username, password, PIN and secret question to identify themselves to the Check Processing System on future transactions.

Customer and transaction data is posted to the Check Processing System database

Customer is redirected to the merchant website along with transaction data

An electronic, Check 21 compliant file containing an image of authorized demand draft is created and electronically sent to a financial institution for processing Check Processing System sends receipt to customer email 3)(b) Pre-Registered Users Check Processing System serves page containing image of demand draft for customer approval or editing Customer enters PIN to authorize demand draft Transaction data is posted to the Check Processing System database Customer is redirected to the merchant website along with transaction data An electronic, Check 21 compliant file containing an image of authorized demand draft is created and electronically sent to a financial institution for processing Check Processing System sends receipt to customer email address One or more of method steps described above can be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in specially-designed ASICs (application-specific integrated circuits).

To provide for interaction with a user, the invention can be implemented on a computer system having a display device such as a monitor or LCD screen for displaying information to the user, and a keyboard and a pointing device (e.g., a mouse or a trackball) by which the user can provide input to the computer system. The computer system can be programmed to provide a graphical user interface through which the computer programs interact with users.

Various implementations of an online payment system and methods for providing payment online have been described. Nevertheless, one of ordinary skill in the art will readily recognize that various modifications may be made to the implementations, and those variations would be within the scope of the present invention. For example, the steps of methods discussed above can be performed in a different order to achieve desirable results. In addition, although FIG. 1 depicts the user system 102, the check processing system 104 and the merchant system 106 as separate systems, two or more of the systems can be combined within a single system. Accordingly, many modifications may be made by one of ordinary skill in the art without departing from the spirit and scope of the following claims.

What is claimed is:

1. A computer-implemented method for processing an online payment from a user, the online payment being for an item that is purchasable through a website of a merchant, the method comprising:

receiving information from the user corresponding to the online payment for the item, the information from the user being received through a graphical user interface associated with the website of the merchant, the information from the user including a name of the user, bank data associated with the user, and an authorization to pay for the item using an electronic check;

creating an electronic image of an authorized demand draft based on the authorization received from the user, the electronic image of the authorized demand draft being created directly from the information provided by the user through the graphical user interface associated with the website of the merchant, the electronic image of the authorized demand draft including the name of the user, the bank data associated with the user;

transmitting the electronic image of the authorized demand draft to a financial institution corresponding to the bank data associated with the user; and receiving funds from the financial institution based on the electronic image of the authorized demand draft to provide payment for the items, wherein creating an electronic image of an authorized demand draft, transmitting the electronic image of the authorized demand draft to the financial institution, and receiving funds from the financial institution based on the electronic image of the authorized demand draft are rerformed in substantially real-time.

2. The method of claim 1, wherein creating an electronic image of an authorized demand draft includes creating an electronic image of an authorized demand draft that is compliant with the Check Clearing for the 21st Century Act (Check 21).

3. The method of claim 2, wherein the electronic image of the authorized demand draft is unsigned by the user.

4. The method of claim 2, wherein creating an electronic image of an authorized demand draft comprises creating an electronic (X9.37) image file.

5. The method of claim 1, further comprising performing one or more real-time verifications on the user prior to creating the electronic image of the authorized demand draft.

6. The method of claim 5, wherein performing one or more real-time verifications on the user comprises generating a blended risk score on the user, the blended risk score corresponding to a degree of risk associated with successfully performing an online payment transaction with the user, the blended risk score being a composite of a plurality of individual risk scores.

7. The method of claim 6, wherein each of the plurality of individual risk scores are weighted by a pre-determined factor.

8. The method of claim 1, wherein:
the item comprises one of a physical product, a service, digital media, or digital content; and
the financial institution is one of a bank, savings and loan (S&L), credit union, or Federal Reserve.

9. The method of claim 1, wherein the processing is completed without printing a paper check.

10. A computer-implemented method for processing an online payment for an item, the method comprising:
receiving information from a user corresponding to the online payment for the item, the information from the user being received through a graphical user interface, the information from the user including an authorization to pay for the item using an electronic check;
creating an electronic image of an authorized demand draft based on the authorization received from the user, the electronic image of the authorized demand draft being created directly from the information provided by the user through the graphical user interfaces,
wherein the electronic image of the authorized demand draft allows a financial institution to transmit funds in substantially real-time, upon receipt of the electronic image of the authorized demand draft.

11. The method of claim 10, wherein creating an electronic image of an authorized demand draft includes creating an electronic image of an authorized demand draft that is compliant with the Check Clearing for the 21st Century Act (Check 21).

12. The method of claim 11, wherein the electronic image of the authorized demand draft is unsigned by the user.

13. The method of claim 11, further comprising:
transmitting the electronic image of the authorized demand draft to a financial institution; and
receiving funds from the financial institution based on the electronic image of the authorized demand draft to provide payment for the item.

14. The method of claim 11, wherein creating an electronic image of an authorized demand draft comprises creating an electronic (X9.37) image file.

15. The method of claim 10, further comprising performing one or more real-time verifications on the user prior to creating the electronic image of the authorized demand draft.

16. The method of claim 15, wherein performing one or more real-time verifications on the user comprises generating a blended risk score on the user, the blended risk score corresponding to a degree of risk associated with successfully performing an online payment transaction with the user, the blended risk score being a composite of a plurality of individual risk scores.

17. The method of claim 10, wherein the information from the user is received through a graphical user interface associated with a website of a merchant through which the item is purchasable.

18. The method of claim 10, wherein the processing is completed without printing a paper check.

19. A check processing system for processing an online payment from a user, the online payment being for an item that is purchasable through a website of a merchant, the system comprising:
a first engine to receive information from the user corresponding to the online payment for the item, the information from the user being received through a graphical user interface associated with the website of the merchant, the information from the user including a name of the user, bank data associated with the user, and an authorization to pay for the item using an electronic check;
a second engine to create an electronic image of an authorized demand draft based on the authorization received from the user, the electronic image of the authorized demand draft being created directly from the information provided by the user through the graphical user interface associated with the website of the merchant, the electronic image of the authorized demand draft including the name of the user, the bank data associated with the user;
a third engine to transmit the electronic image of the authorized demand draft to a financial institution corresponding to the bank data associated with the user; and
a fourth engine to receive funds from the financial institution based on the electronic image of the authorized demand draft to provide payment for the item,
wherein the fourth engine is operable to receive the funds from the financial institution in substantially real-time relative to when the electronic image of the authorized demand draft is created and transmitted to the financial institution.

20. The system of claim 19, wherein the electronic image of the authorized demand draft is compliant with the Check Clearing for the 21st Century Act (Check 21).

21. The system of claim 20, wherein the electronic image of the authorized demand draft is unsigned by the user.

22. The system of claim 20, wherein the electronic image of an authorized demand.

23. The system of claim 19, wherein one or more of the first engine, the second engine, the third engine, and the fourth engine are components of a single engine.

24. The system of claim 19, further comprising a fifth engine operable to perform one or more real-time verifications on the user prior to the second engine creating the electronic image of the authorized demand draft.

25. The system of claim 24, wherein the fifth engine operable to perform one or more real-time verifications including generating a blended risk score on the user, the blended risk score corresponding to a degree of risk associated with performing an online payment transaction with the user, the blended risk score being a composite of a plurality of individual risk scores.

26. The system of claim 25, wherein each of the plurality of individual risk scores are weighted by a pre-determined factor.

27. The system of claim 19, wherein the processing is completed without printing a paper check.

28. A computer-implemented method for processing an online payment for an item, the method comprising:

receiving information from a user corresponding to the online payment for the item, the information from the user being received through a graphical user interface, the information from the user including an authorization to pay for the item using an electronic check;

creating an electronic (X9.37) image file of an authorized demand draft based on the authorization received from the user, the electronic (X9.37) image file of the authorized demand draft being created directly from the information provided by the user through the graphical user interface;

transmitting the electronic (X9.37) image file directly to the Federal Reserve; and receiving funds from the Federal Reserve based on the electronic (X9.37) image file, wherein the funds are received from the Federal Reserve substantially in real-time relative to a time of the transmission of the electronic (X9.37) image file to the Federal Reserve.

29. The method of claim 28, wherein the processing is completed without printing a paper check.

* * * * *